United States Patent
Jacobson

(10) Patent No.: US 7,387,653 B2
(45) Date of Patent: Jun. 17, 2008

(54) APPARATUS AND METHOD FOR REMOVING PARTICULATES FROM A FLUID STREAM

(76) Inventor: Wayne D. Jacobson, 4358 Bramblewood Ave., St. Paul, MN (US) 55127-3502

( * ) Notice: Subject to any disclaimer, the term of this patent is extended or adjusted under 35 U.S.C. 154(b) by 0 days.

(21) Appl. No.: 11/728,352

(22) Filed: Mar. 26, 2007

(65) Prior Publication Data

US 2007/0227105 A1    Oct. 4, 2007

Related U.S. Application Data

(60) Provisional application No. 60/788,299, filed on Mar. 31, 2006, provisional application No. 60/830,023, filed on Jul. 11, 2006.

(51) Int. Cl.
*B01D 45/12* (2006.01)
(52) U.S. Cl. .............................. 55/343; 55/345; 55/348; 55/430; 55/437
(58) Field of Classification Search .................. 55/343, 55/345, 346, 348, 349, 426, 430, 437
See application file for complete search history.

(56) References Cited

U.S. PATENT DOCUMENTS

| | | | | |
|---|---|---|---|---|
| 3,365,058 | A * | 1/1968 | Petersen | 209/712 |
| 3,425,192 | A * | 2/1969 | Davis | 55/345 |
| 4,309,283 | A | 1/1982 | Vikio et al. | |
| 4,692,311 | A * | 9/1987 | Parker et al. | 422/144 |
| 7,070,637 | B1 | 7/2006 | Zhang | |
| 7,105,035 | B2 | 9/2006 | Oh et al. | |
| 7,140,558 | B2 | 11/2006 | McCracken et al. | |
| 7,159,723 | B2 | 1/2007 | Hilpert et al. | |
| 7,162,770 | B2 | 1/2007 | Davidshofer | |
| 7,163,568 | B2 | 1/2007 | Sepke et al. | |
| 7,166,141 | B2 | 1/2007 | Skinner Macleod et al. | |
| 7,166,230 | B2 | 1/2007 | Nilsen et al. | |
| 7,175,364 | B2 | 2/2007 | Gaertner et al. | |
| 7,175,682 | B2 | 2/2007 | Nakai et al. | |
| 7,179,314 | B2 | 2/2007 | Conrad et al. | |
| 7,179,427 | B2 | 2/2007 | Marchant et al. | |

FOREIGN PATENT DOCUMENTS

JP            62254858 A    * 11/1987

* cited by examiner

*Primary Examiner*—Robert A Hopkins
(74) *Attorney, Agent, or Firm*—Patterson, Thuente, Skaar & Christensen, PA

(57) ABSTRACT

An assembly for cleaning particulates from fluid streams has a primary and secondary centrifuge collectors and may employ negative pressure to produce the fluid stream. The primary centrifuge collector forms an outer vortex to remove larger particles, then an inner vortex to produce higher centrifugal forces upon and to remove a portion of the particulates. In the secondary centrifuge collector, a plurality of secondary centrifuge collector units are present. The partially cleaned fluid stream enters one of the secondary centrifuge collector units, where swirl vanes form an outer vortex. The fluid flow travels along the secondary vortex to the bottom of the secondary centrifuge collector unit, where the direction of the fluid flow is reversed and the fluid flow is subjected to a higher energy inner vortex. The centrifugal forces exerted by these vortices convey the particulates to the walls of the secondary centrifuge units, where the particulates are evacuated initially by gravity for disposal. The cleaned fluid flow may then be released into the environment.

19 Claims, 12 Drawing Sheets

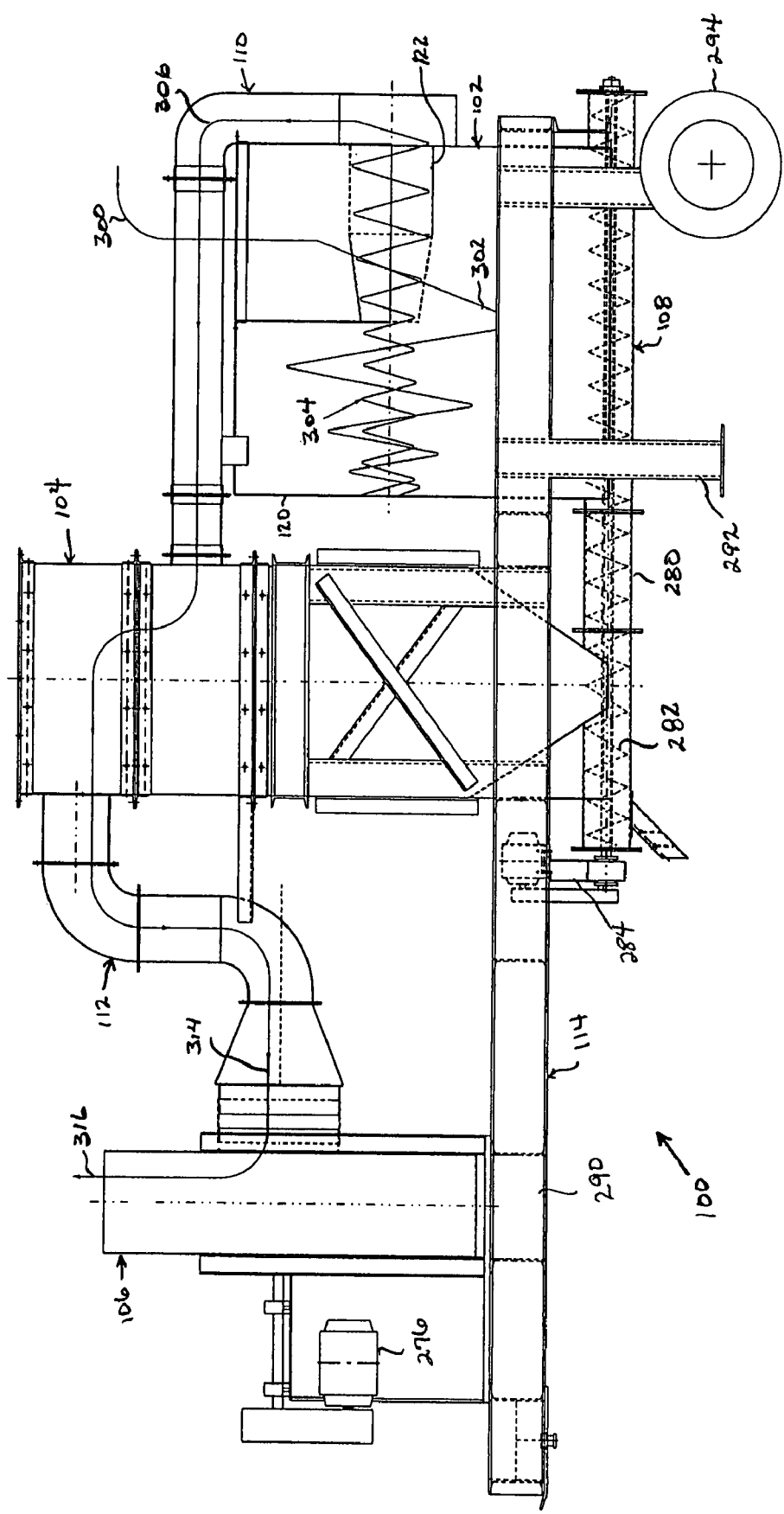

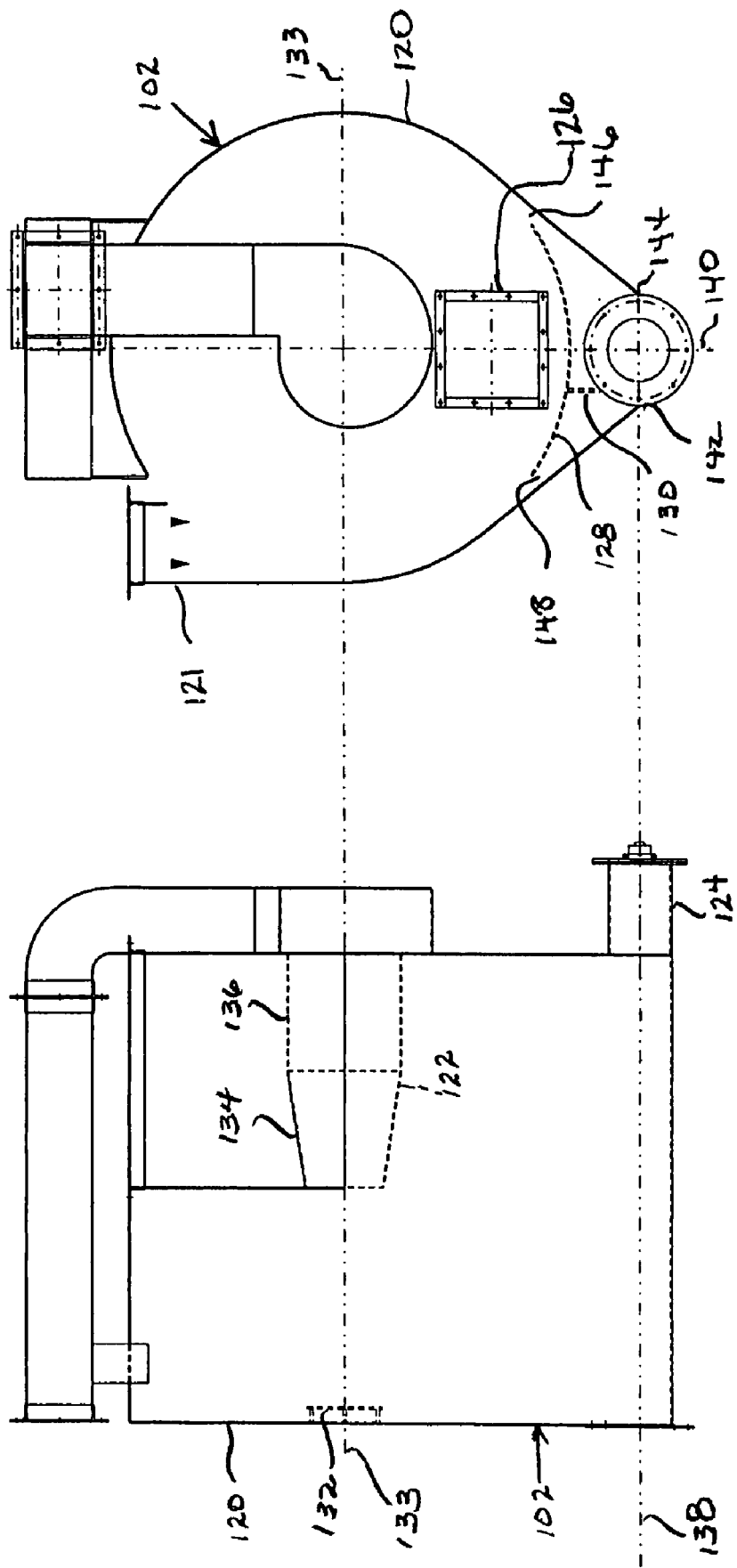

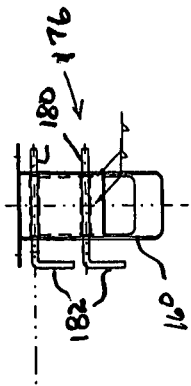
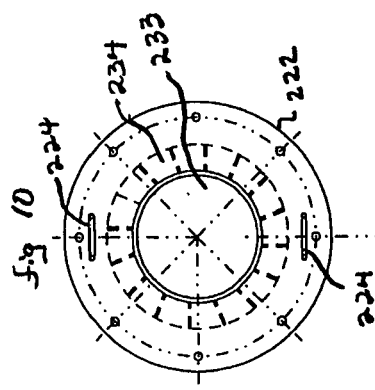
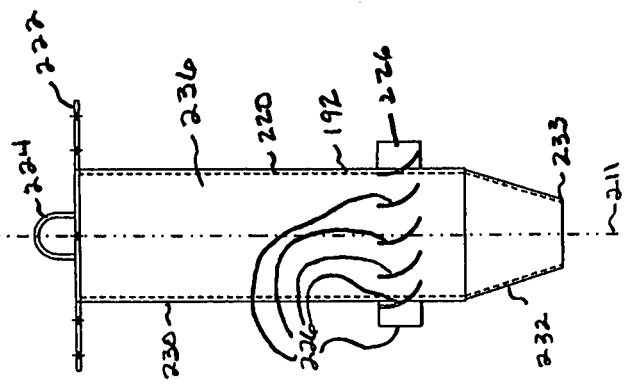
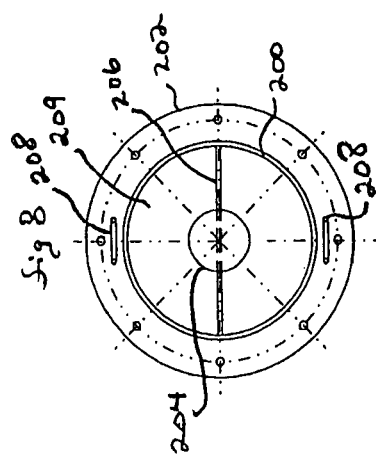
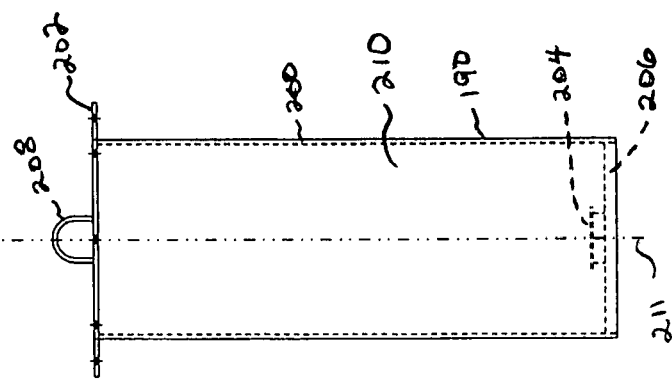

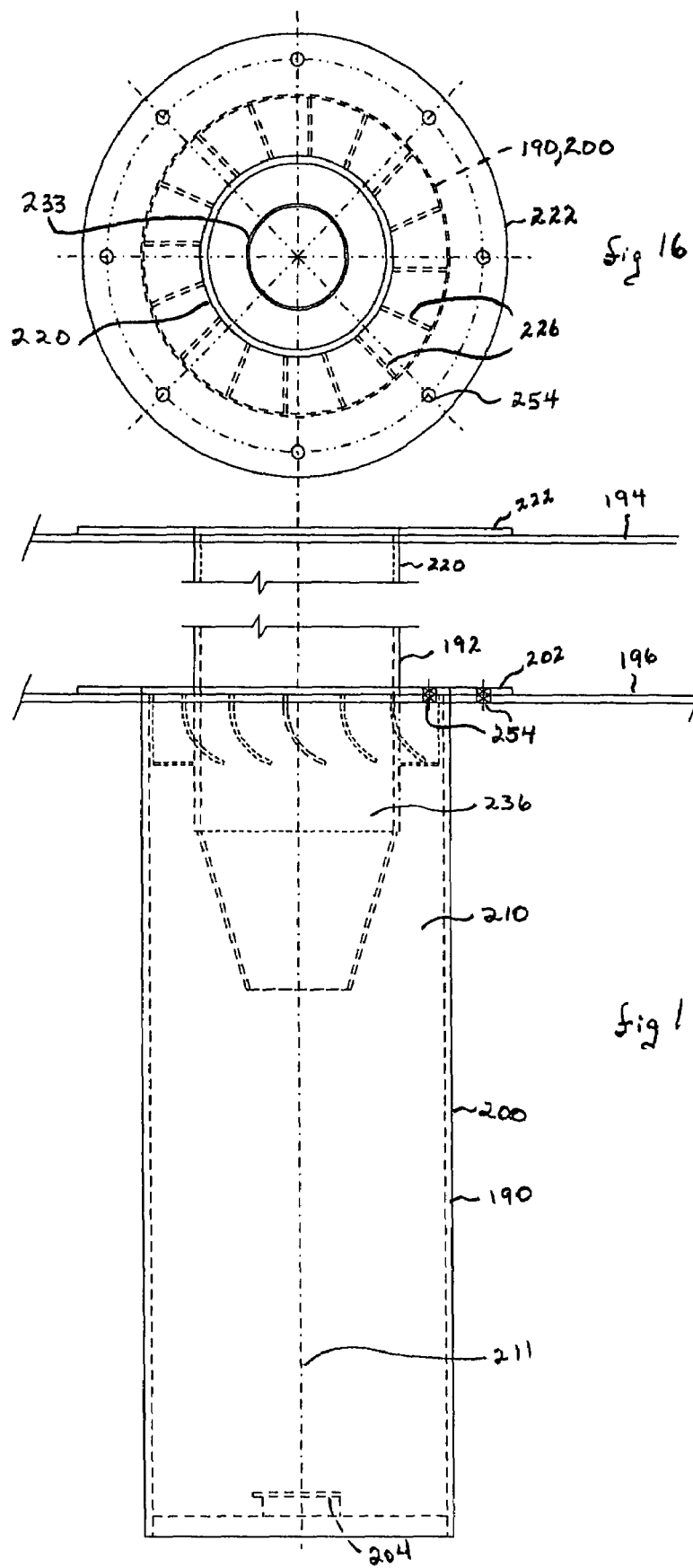

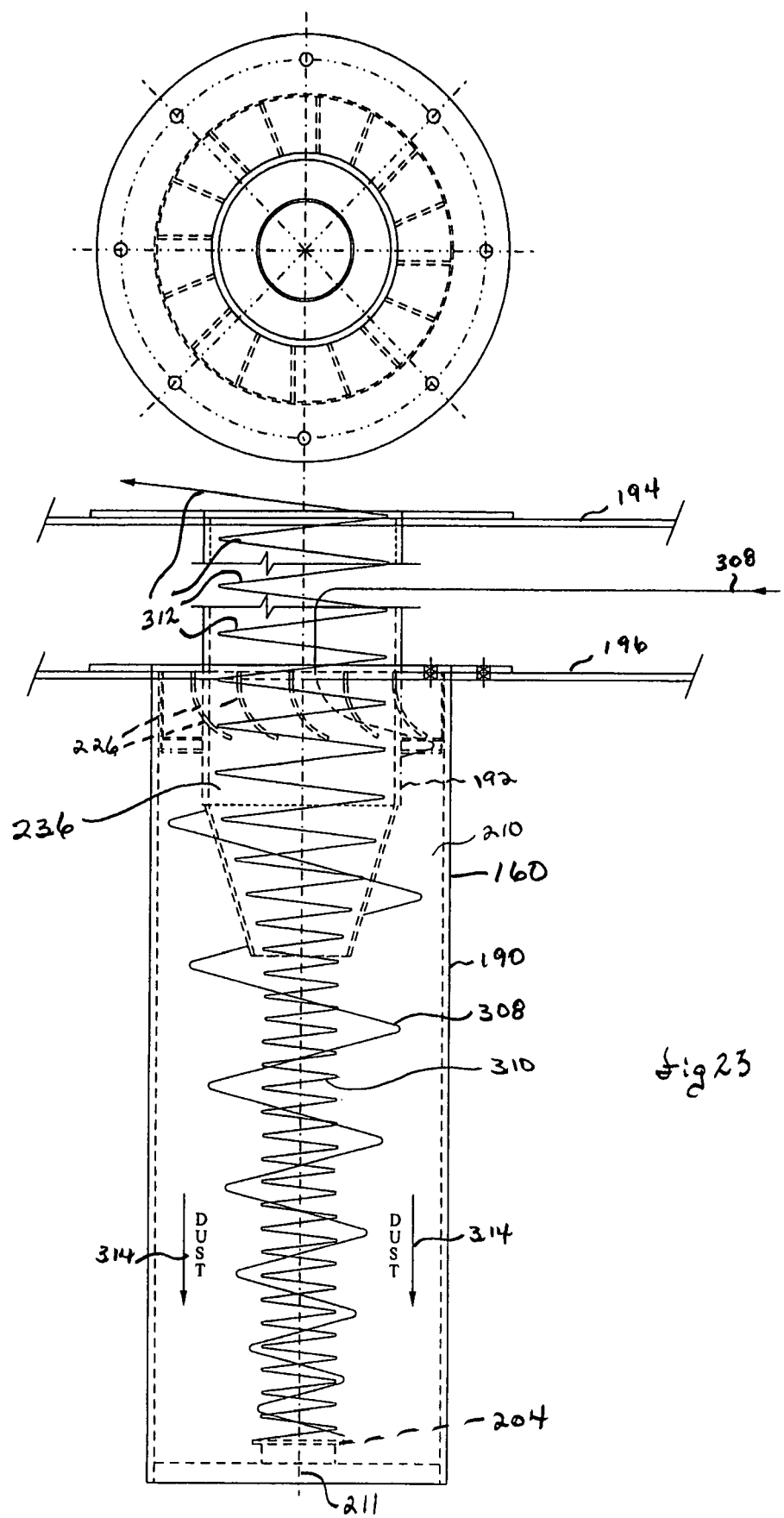

APPARATUS AND METHOD FOR REMOVING PARTICULATES FROM A FLUID STREAM

CROSS-REFERENCES TO RELATED APPLICATIONS

This application claims priority under 35 U.S.C. § 119 (e) to, and hereby incorporates by reference, U.S. Provisional Application No. 60/788,299, filed 31 Mar. 2006 and U.S. Provisional Application No. 60/830,023, filed 11 Jul. 2006.

BACKGROUND OF THE INVENTION

1. Field of the Invention

This invention relates to fluid cleaning devices and, in particular, this invention relates to devices for cleaning fluid streams without the use of filters.

2. Background

Particulate-laden fluid streams from industrial processes must often be cleaned before being released into the environment. For example, hot asphalt mix plants with direct-fired rotary drum dryers generated untreated exhaust gas streams that will not pass current or future codes until the particulates are removed therefrom. Presently, the best available method of doing so is the filter bag house, which is inefficient and expensive to operate. These filter bag houses use filters which become progressively more plugged by oil and particulates. Consequently, these filter bag houses become progressively more inefficient as the filters become progressively more plugged with materials being cleaned from the air stream. Additionally, replacing or cleaning the bag filters is time consuming and costly and often requires that the plants discontinue operation during maintenance activities of this nature. Therefore, there is needed a device and method which efficiently eliminates particulates and other pollutants from industrial air streams without using filters to do so.

SUMMARY OF THE INVENTION

This invention substantially meets the aforementioned needs of the industry by providing an assembly, which does not employ filters or bags when cleaning particulates or other pollutants from fluid streams, such as gas-borne dusts; hence does not become progressively more plugged with removed particulates during use. Such fluid streams with gas-borne particulates arise from such industrial applications as hot mix asphalt plants, cement plants, coal fired boilers, foundries, ethanol plants, and the like. In the instant invention, there is no fabric or other filter material. Thus, there is no filter to be plugged by oil or particulate accumulation or to be cleaned (shaken out) or replaced periodically. Moreover, the cleaning assembly of this invention has the capability of running continuously and is immune to high temperatures, as well as fires which often occur in the filter bag houses of the prior art. The present invention is at least as efficient, usually more efficient, as the bag houses of the prior art, because the present invention exerts, in its spin cycle, a force on the particulates, which may be 9000 times the force of gravity. It is believed that this invention will involve considerably lower costs, both to build and to operate, than the foregoing cleaning facilities of the prior art. Moreover, construction of the unit of this invention involves components and parts easily obtainable by those of ordinary skill in the art. Thus, there are no particular or special needs for fabrication of especially built parts.

In this invention, particulate-containing air may be first passed through a high performance hydroclone-design primary centrifuge dust collector, such as a vertical or horizontal primary centrifuge (or cyclone) to reduce particulate load on a follow-up high efficiency secondary centrifuge collector. This two-stage combination results in a final, efficiently cleaned, air stream equal to, or exceeding, the performance of bag houses. The secondary centrifuge has an axial vane design, which passes air from the primary centrifuge through a ring of swirl vanes, which are mounted horizontally between an inlet cylinder and an outlet cylinder to produce a uniform non-turbulent spin or vortex. The dust-containing air spends downwardly and is drawn radially inwardly to exit through the central, tapered outlet, thereby producing a vortex of extremely high spin velocity. This high tangential velocity at a very small radius creates a centrifugal force on the particulates often more than 9000 times the force of gravity, thereby separating the particulates from the air flow. A circular plate may be centrally mounted just above the air exit opening to provide a vortex cut-off to thereby prevent re-entrainment of collected dust (separated particulates). This feature in the primary centrifuge is provided by the body vertical and plate. Dust is centrifuged to the outer wall in the secondary centrifuge, where it slides downwardly to the collector outlet. When in the collector outlet, disposal may be provided by screw conveyor, collector belt, or the like, then followed by a gravity-operated air valve or rotary air-lock.

It is therefore an object of this invention, to provide an assembly for separating particulates from a fluid stream, the assembly comprising a primary centrifuge collector and a secondary centrifuge collector. The primary centrifuge collector may receive the fluid stream with particulates and may comprise an outer housing and an egress conveying the fluid stream away from the primary centrifuge collector. The secondary centrifuge collector may comprise a plurality of secondary centrifuge collector units positioned within a secondary centrifuge collector housing. Each secondary collector unit may receive a portion of the fluid stream from the primary centrifuge collector and may remove more of the particulates from the fluid stream. Each secondary centrifuge collector unit may comprise an outer cylinder and a vaned outlet element, which may comprise a concentric insert disposed with respect to the outer cylinder.

A further object of the invention is to provide a secondary centrifuge, which may include a housing and a plurality of secondary centrifuge units disposed within the housing. Each of the secondary centrifuge units may include an outer cylinder and a vaned outlet element, which may be generally concentric to the outer cylinder and which may receive a vortexed air stream induced by the vanes. The vortexed air stream may centrifugally separate the particulates.

Yet another object is to provide a method of cleaning particulates from an air stream by centrifugal force by means of the foregoing assembly for separating particulates and/or secondary centrifuge.

It is a feature of this invention that centrifugal force, rather than filters, is used to separate particulates from a fluid stream. It is an advantage of the foregoing feature that cleaning fluid streams by the assembly of this invention may be affected without changing or cleaning air filters. It is another advantage of the foregoing feature that the progressively less efficient fluid-cleaning devices of the prior art are replaced by the instant assembly, in which there are no filters to be progressively plugged by particulates.

It is another feature of this invention that a plurality of secondary centrifuge collector units are housed within a singular centrifuge collector housing. It is an advantage of the foregoing feature that particulates separated from fluid streams by the secondary collector units may be evacuated by a single disposal assembly in one embodiment of this invention.

It is yet another feature of this invention to provide secondary centrifuge collectors having swirl vanes arranged horizontally. It is an advantage of the foregoing feature that the swirl vanes impart a non-turbulent spin to form a vortex for removing particulates.

It is still another feature of this invention to provide secondary centrifuge collectors having internal substantially coned shapes at central outlets. It is an advantage of the foregoing feature that the internal substantially coned shapes increase spin velocity to greatly increase centrifugal forces on the particles, thereby more efficiently separating the particles from the air stream.

It is still yet another feature of this invention to provide a circular plate, vertical in the primary centrifuge collector and horizontal in the secondary centrifuge collector, which is mounted opposite the outlets thereof. It is an advantage of the foregoing feature that re-entrained collected particulates otherwise generated by the cyclonic vortices are prevented.

It is yet still another feature of this invention that the number of secondary centrifuge collector units is variable. It is an advantage of the foregoing feature that the cleaning apparatus of this invention can be adapted for any magnitude of fluid flow to be cleaned, as well as for fluid flows having differing amounts and types of particulates or other impurities to be separated therefrom.

It is yet still another feature that embodiments of this invention may be made from steel alloys or other heat-resisting materials. It is an advantage of the foregoing feature that the cleaning assembly of this invention can operate continuously at extreme temperatures, without becoming plugged by removed particulates at efficiencies equal to, or surpassing, bag houses of the prior art.

These and other objects, features, and advantages of this invention will become apparent from the description which follows, when considered in view of the accompanying drawings.

BRIEF DESCRIPTION OF THE DRAWINGS

FIG. 1 is a side view of one embodiment of the assembly of this invention for removing particulates from a fluid stream.

FIG. 2 is a side view of one embodiment of a primary centrifuge collector of this invention.

FIG. 3 is an end in view of the primary centrifuge collector of FIG. 2.

FIG. 7a is a fragmentary cross-section of the trickle valve present in the spout of the secondary centrifuge collector of FIG. 4.

FIG. 8 is a plan view of a secondary centrifuge collector unit outer cylinder of this invention.

FIG. 9 is a side view of the secondary centrifuge collector unit outer cylinder of FIG. 8.

FIG. 10 is a plan view of a secondary centrifuge collector unit outlet element of this invention.

FIG. 14 is a plan view of the swirl vane of FIG. 12 attached to a secondary centrifuge collector unit outlet element of this invention.

FIG. 16 is another plan view of the assembled secondary centrifuge collector unit outer cylinder and secondary centrifuge collection outlet element.

FIG. 17 is another side view of the assembled secondary centrifuge collector unit outer cylinder and secondary centrifuge collection unit outer element.

FIG. 23 is a side view operationally depicting fluid flow in the secondary centrifuge collector unit of this invention.

Figure 4:
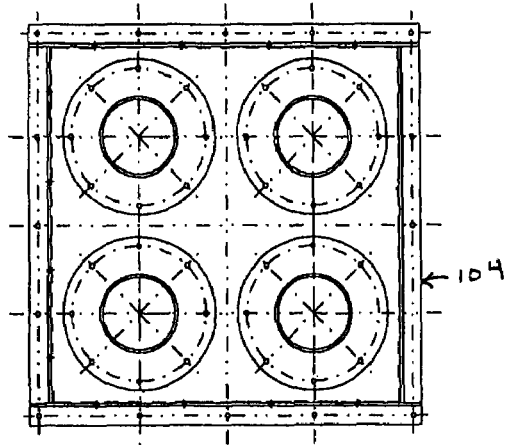
FIG. 4 is a plan view of the top plate of one embodiment of a secondary centrifuge collector of this invention.
Figure 6:
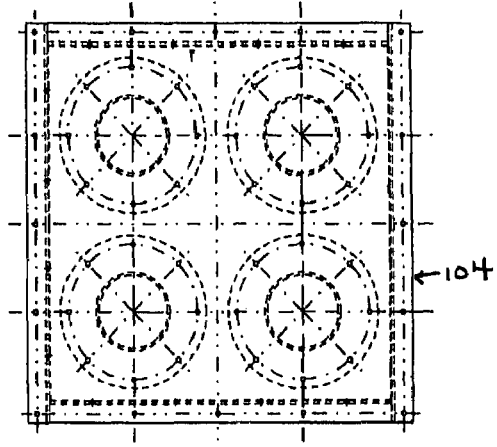
FIG. 6 is another plan view of the top plate of the secondary centrifuge collector of FIG. 4.
Figure 5:
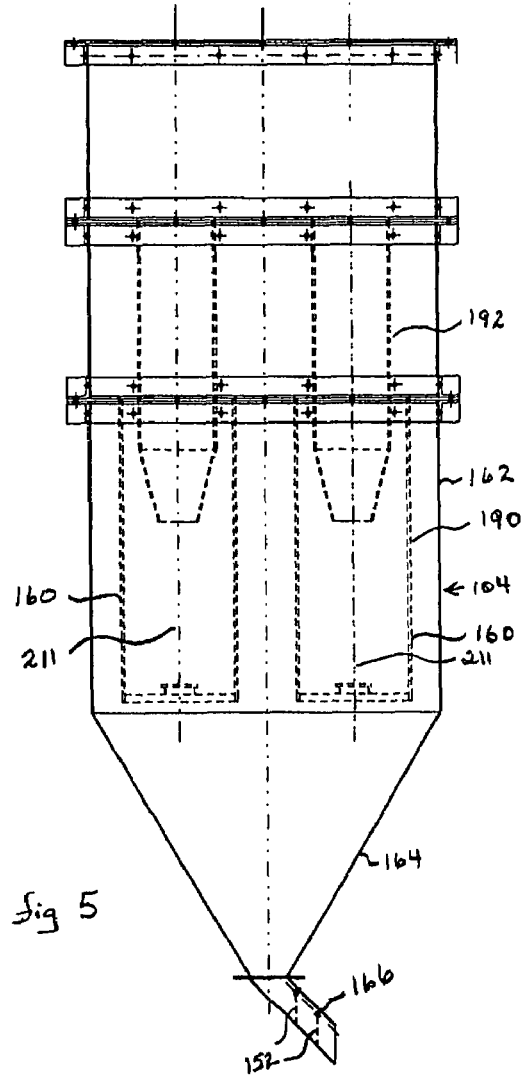
FIG. 5 is a side view of the secondary centrifuge collector of FIG. 4.
Figure 7:
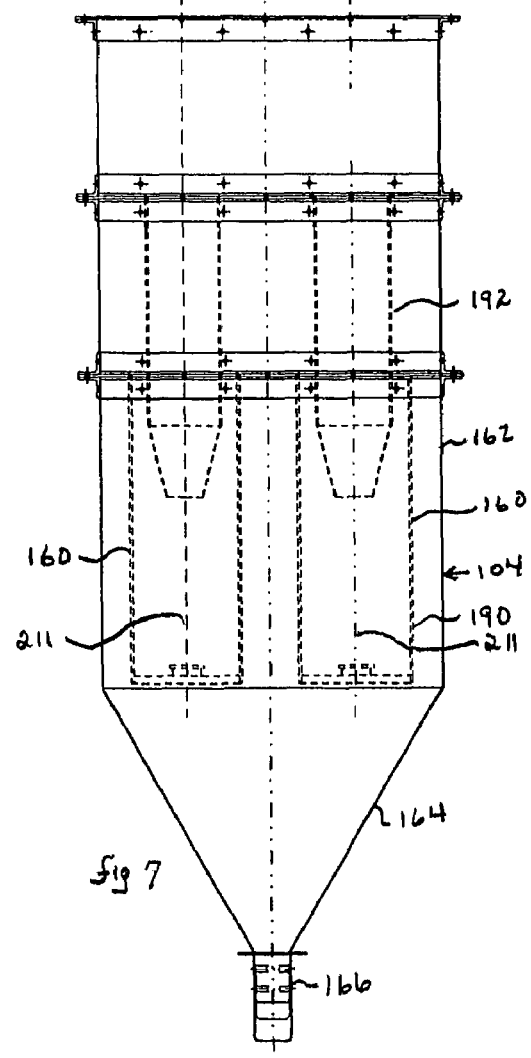
FIG. 7 is an end view of the secondary centrifuge collector of FIG. 4.

It is understood that the above-described figures are only illustrative of the present invention and are not contemplated to limit the scope thereof.

DETAILED DESCRIPTION

Any references to such relative terms as vertical and horizontal or inner and outer are intended for convenience of description and are not intended to limit the present invention or its components to any one positional or spatial orientation. All dimensions of the components in the attached figures may vary with a potential design and the intended use of an embodiment of the invention without departing from the scope of the invention.

Referring to FIG. 1, one embodiment of an assembly for removing particulates from a fluid stream of this invention is indicated generally at 100 and includes a primary centrifuge collector 102, a secondary centrifuge collector 104, an induced draft fan 106, a particulate disposal assembly 108, respective first and second duct assemblies 110 and 112, and a support frame 114.

Referring now to FIGS. 1, 2, and 3, the primary centrifuge collector 102 of this embodiment may include an outer housing 120 forming an ingress such as an inlet 121, an egress such as outlet cylinder 122, and structure for removing particulates separated from the incoming fluid flow in the primary centrifuge dust collector, such as an auger assembly 124. In this embodiment, the inlet 121 is unitarily (or otherwise integrally) formed from the housing 120. However, a person of ordinary skill in the art would readily recognize that such inlet could be formed separately, then attached to the remainder of the housing 120. Additionally, the embodiment depicted has an access opening (not shown), which is covered by an access plate 126. The primary centrifuge collector 102 may optionally include a generally curved guide plate 128 with attached particle reflexive 130 and maintained in place by a housing plate weld and a reflexive plate 132. The reflexive plate 132 may be generally aligned with the outlet cylinder 122 as shown by line 133. The embodiment of the outlet cylinder 122 shown includes an inner cone frustum 134 and an extension 136.

By way of illustration and not limitation, as viewed in FIG. 2 the primary centrifuge collector 102 may have a depth of 72 inches, as viewed along lines 133 or 138 (excluding the extension represented by the auger assembly 124). As viewed by FIG. 3, the primary centrifuge collector 102 may have a height of 88¼ inches as measured along line 140 and a width of 72 inches as measured along line 133. The inlet 121 may be rectangular with exemplary dimensions of 12 inches by 36 inches. The generally circular portion of the primary centrifuge collector 102 may have a radius of 36 inches and the extension 136 of the outlet cylinder 122 may have a radius of 36 inches. The generally linear portion of the inlet 121 coinciding with the periphery of the housing 120 may have a length of 36 inches. The lower portions of the housing 120 may taper to a tangent 142 or 144, the lower portions having a length of 37⅞ inches. The extension 136 of the outlet cylinder 122 may have an inner diameter of 17⅝ inches, the extension 136 being bonded to the inner cone frustum 134 at one end thereof. Accordingly, the inner cone frustum 134 tapers from an inner diameter of 17⅝ inches to 12 inches. The inner frustum 134 and the extension 136 may both have lengths of 18 inches, thereby combining for a total length of 36 inches for the outlet cylinder 122. In the embodiment depicted, the reflexive plate 132 is generally circular, having a diameter coinciding with that of the inner frustum cone 134, e.g., 12 inches. The guide plate 128 may have a length of 72 inches and a width 40¾ inches. When configured as depicted in FIG. 3, the guide plate 128 may extend along an arc of 70 degrees, at a radius of 33¾ inches, so as to define gaps 146 and 148 between the guide plate 128 and the housing 120. A person of ordinary skill in the art will readily recognize that these dimensions may be altered as needed, e.g., to accommodate fluid (air) streams of varying magnitudes.

As shown in FIGS. 1 and 4-7, a first embodiment of the secondary centrifuge collector 104 includes a plurality, e.g., four secondary centrifuge collector units 160. However, it should be recognized tat any number of such secondary centrifuge collector units may be present, the exact number depending upon factors such as the magnitude of fluid stream to be cleaned and the nature and concentration of the particulates present within the fluid stream. As best viewed in FIGS. 5 and 7, the exterior of the secondary centrifuge collector 104 has an upper panel 162 and a tapered lower hopper 164 extending from the upper panel 162. The lower hopper 164 tapers to a spout 166. The spout 166 may include a structure to expel particulates separated from the fluid stream during operation. One suitable such structure depicted in FIG. 7a is a trickle valve 176, which includes a pair of paddles 152 disposed within the spout 166. The paddles 152 are attached and operated by pivots 180. Each pivot 180 may terminate in a handle 182, which may extend generally perpendicularly to the pivot 180.

As best viewed in FIGS. 8-11, each of the secondary centrifuge collector units 160 (FIG. 7) has an outer cylinder 190 and an outlet element 192. The outer cylinder 190 and outlet element 192 are assembled within the secondary centrifuge collector unit 160 using respective upper and lower plates 194 and 196 (FIG. 23) so that a plurality of secondary centrifuge collector units 160 are present therein. The outer cylinder 190 (FIG. 17) includes a cylindrical member 200, flange 202, reflexive plate 204, bar 206, and optional handles 208 (FIG. 9). The flange 202 is bonded to the cylindrical member 200 (e.g., by welds) and defines a concentric opening 209. The opening 209 adjoins a cavity 210 defined in the cylindrical member 200. The plate 204 is attached to the bar 206, e.g., by welds, and aligns with the outlet element 192 as shown by its relation to the line 211 in FIGS. 9 and 11. The bar 206, in turn, is attached (e.g., by welds) to a lower periphery of the cylindrical member 200, so as to support the plate 204.

Figure 11:
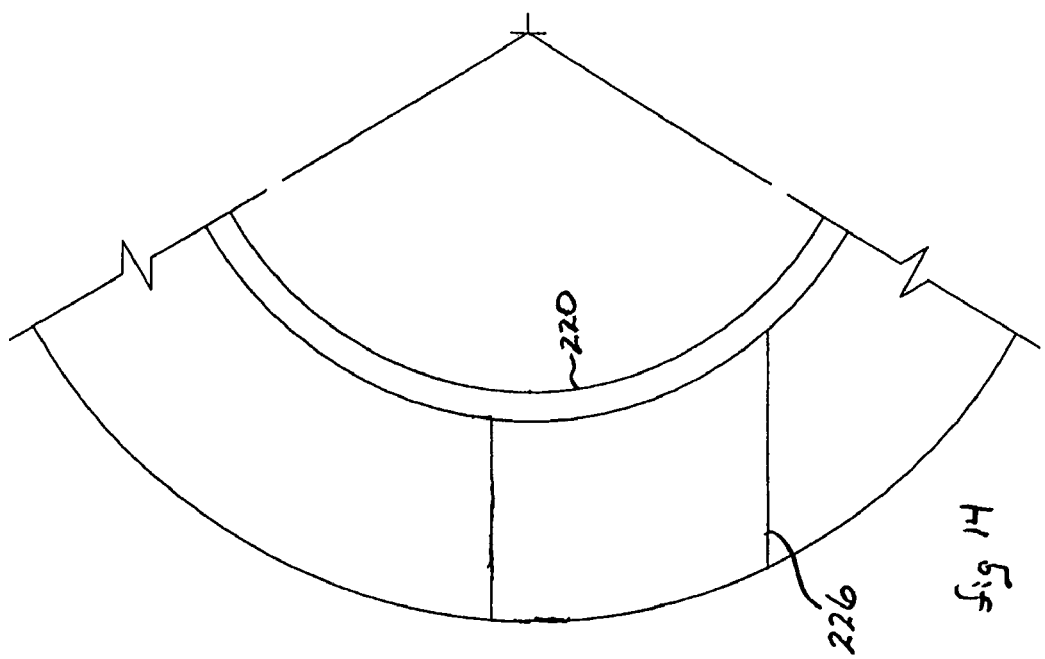
FIG. 11 is a side view of the secondary centrifuge collector unit outlet element of FIG. 10.
Figure 13:
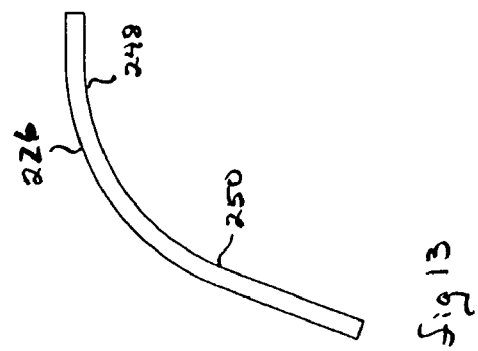
FIG. 13 is an end view of the swirl vane of FIG. 12.
Figure 12:
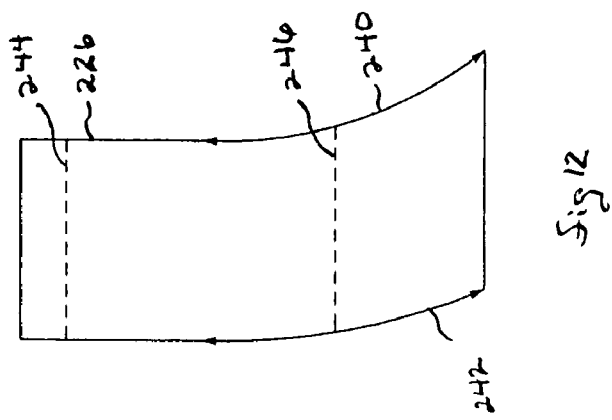
FIG. 12 is a perspective view of one embodiment of a swirl vane of this invention.
Figure 15:
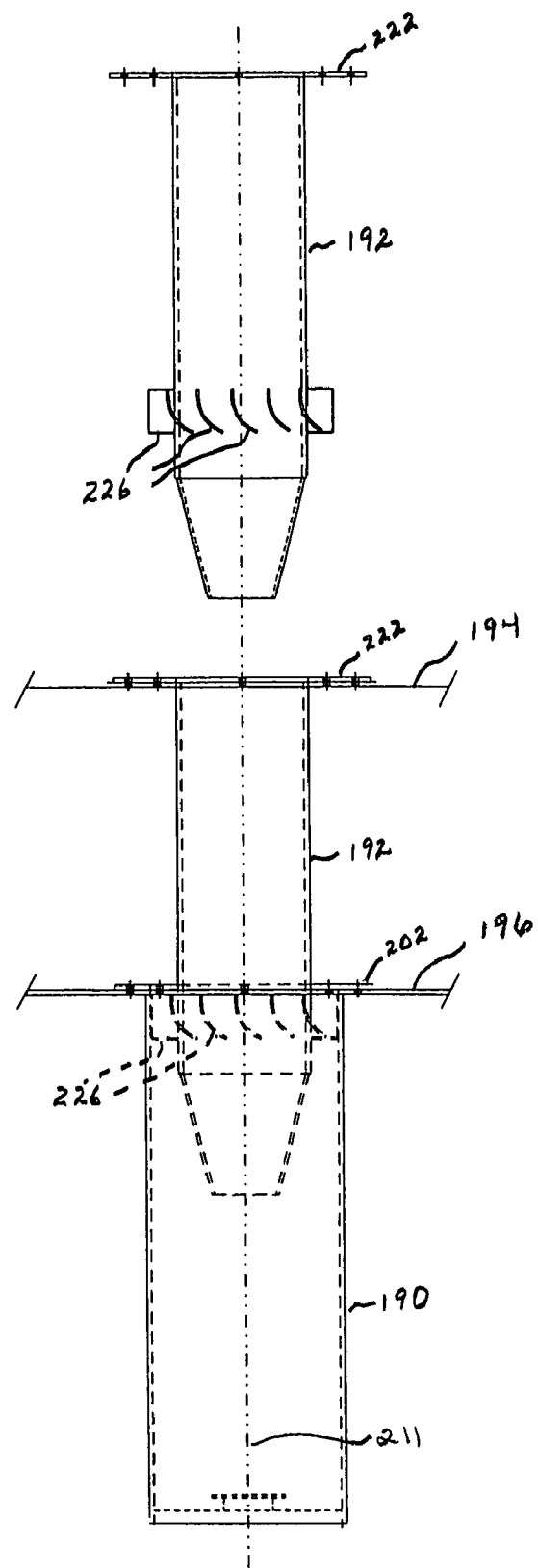
FIG. 15 is a side view depicting how the secondary centrifuge collector unit outer cylinder and secondary centrifuge collector unit outlet element of this invention are assembled.
Figure 18:
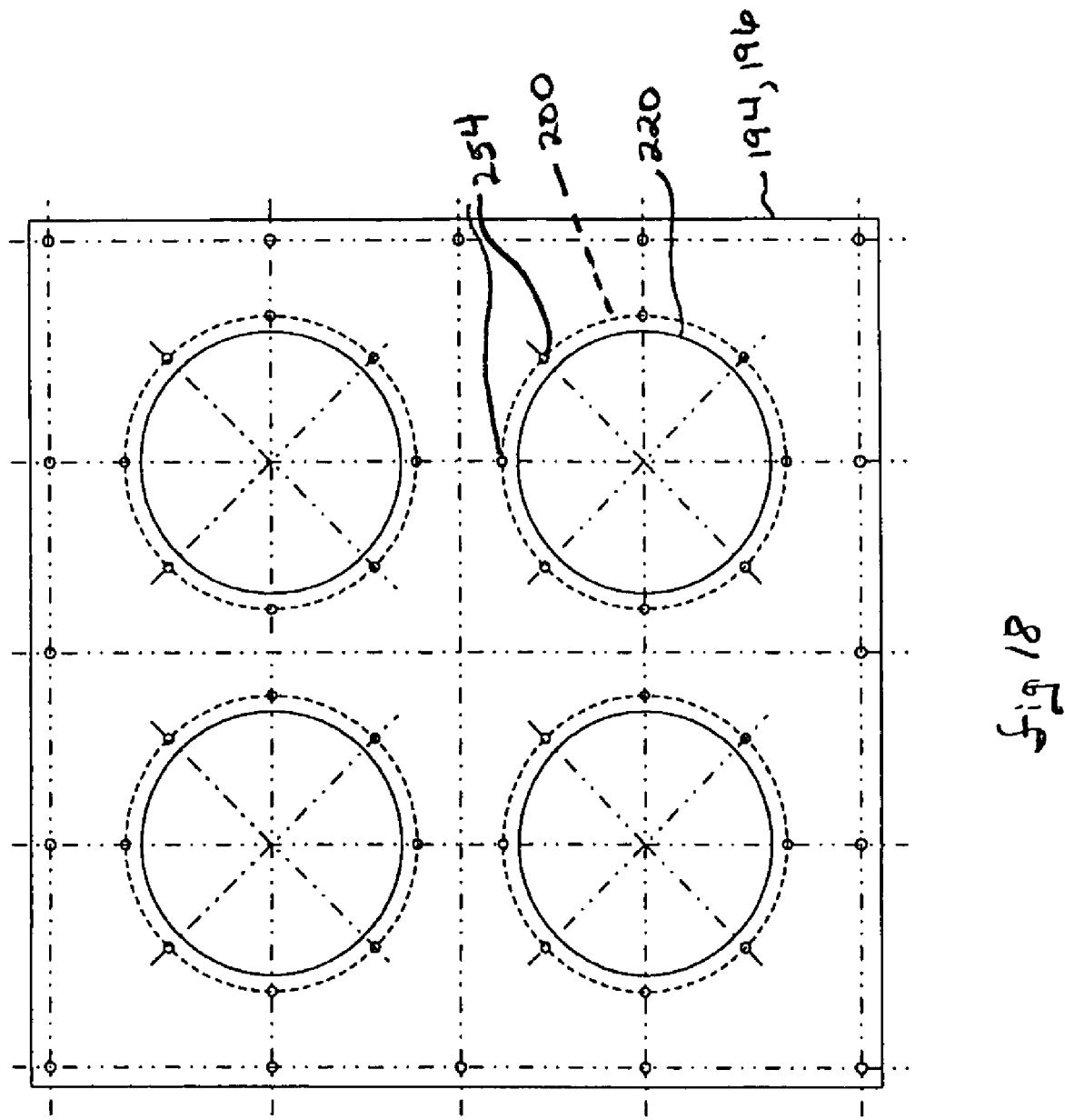
FIG. 18 is a plan view of an upper plate of the secondary centrifuge collector unit of this invention.

In FIGS. 10-11 may be seen details of the outlet element 192, which includes a cylindrical member 220, a flange 222, optional handles 224, and swirl vanes 226. The cylindrical member 220 includes a cylindrical element 230 terminating in a frustum cone 232 having a terminal opening 233. The flange 222 defines an opening 234, which adjoins a cavity 236 defined in the cylindrical member 220. As best seen in FIGS. 12-14, the swirl vanes 226 are attached to the cylindrical member 220. Alternatively, the swirl vanes could be attached to an inner surface of the cylindrical member 200 of the outer cylinder 190. Sixteen swirl vanes, deployed every 22½ degrees, are present in the embodiment depicted. However, a person of ordinary skill in the art will recognize that more or fewer swirl vanes may be present in other embodiments depending on such factors as the magnitude of the fluid flow to be cleaned, the amount of particulates to be separated, the dimensions of the outer cylinder and outlet element, and the pressures exerted by the fluid flow within the system of this invention. The swirl vanes 236 are configured so as to define a downward spiral during operation, for example and as shown in FIG. 12, having a radius of 5¹¹⁄₁₆ inches at curve 240, a radius of 9½ inches at curve 242, a rollup of about 70 degrees and a three inch radius between lines 244 and 246. Additionally and as best viewed in FIG. 13, an arc of 70 degrees may extend between points 248 and 250, the remainder of the swirl claim 226 being generally planar in configuration. As seen in FIG. 14, the swirl vane 226 is attached, e.g., by welding, to the cylindrical member 220.

As depicted in FIGS. 15-18, in assembling the outer cylinder 190 and outlet element 192, the outer cylinder 190 is first lowered into place and attached to the lower plate 196. The outlet element 192 is then lowered into place and attached to the upper plate 194, e.g., using connectors such as bolts 254.

By way of illustration and not limitation, the cylindrical member 200 of the outer cylinder 190 may have an outer diameter of 16 inches and a height of 43 inches. The flange 202 may have a radius of about 11 inches, with an inner opening of about 16 inches. The reflexive plate 204 may have a diameter of about five inches. The outlet element 192 may have a length of about 32 inches and an outer diameter of about 10 inches. The frustum cone 232 may be about eight inches in length and taper from an inner diameter of about 10 inches to about five inches. The flange 222 may have an outer radius of about 11 inches and have a concentric opening about 10 inches in diameter. The secondary centrifuge collector 104 depicted in FIG. 1 has a height of 11 feet 9½ inches (excluding the spout 166) and a width and length of four feet. When assembled as described above, the upper and lower plates are about 24⅞ inches spaced apart when the outer cylinder 190 and outlet element 192 are fixed into position.

Figure 20:
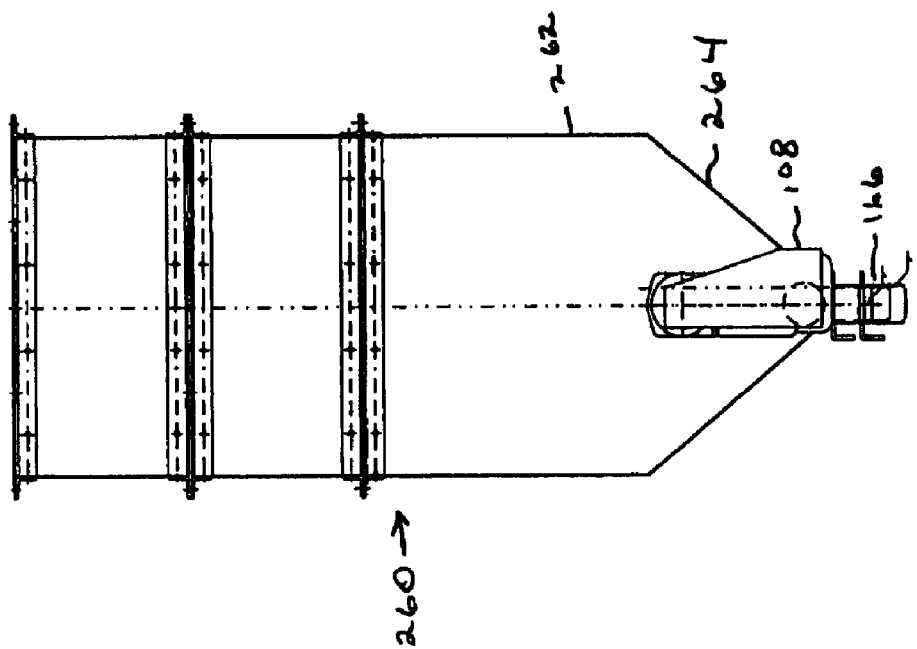
FIG. 20 is a front view of the secondary centrifuge collector of FIG. 19.
Figure 19:
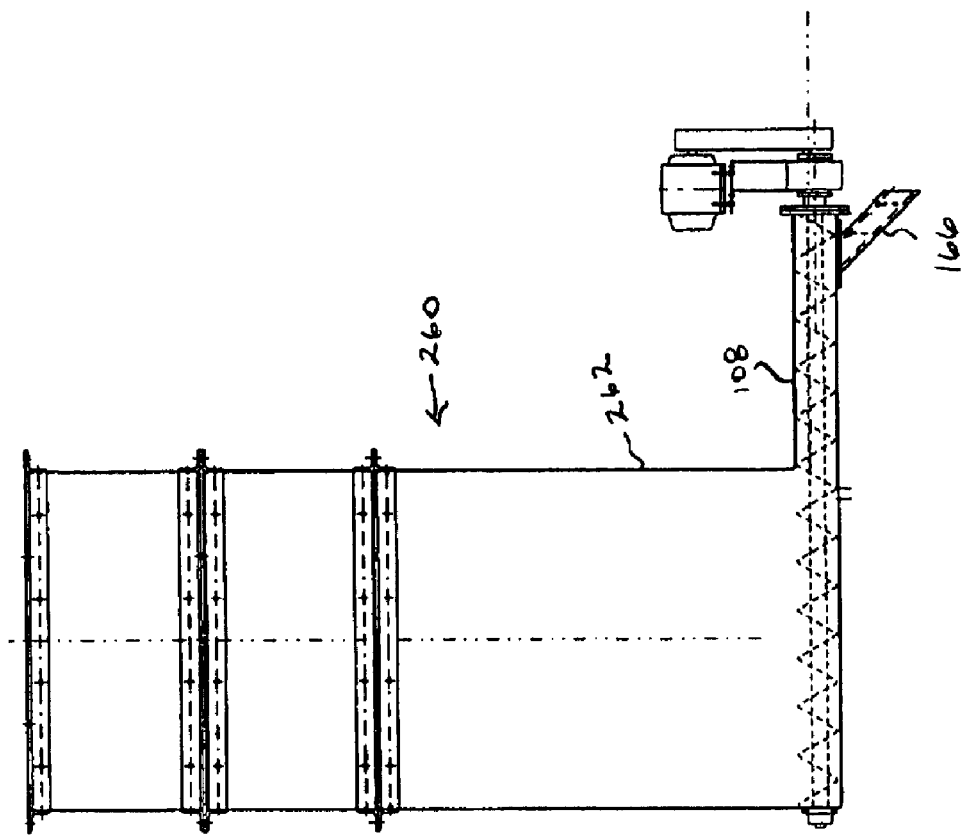
FIG. 19 is a side view of another embodiment of the secondary centrifuge collector of this invention.

Referring to FIGS. 19 and 20, another embodiment of the secondary centrifuge collector of this invention is indicated generally at 260, wherein the auger 108 is formed integrally with the outer housing 262 of this secondary centrifuge collector. The spout 166 extends proximate the exit end of the auger unit 108. In the secondary centrifuge collector 260, as in the secondary centrifuge collector 104, all four secondary centrifuge collector units 160 empty into a single auger 108 as enabled by a single tapering lower hopper 264.

Figure 22:
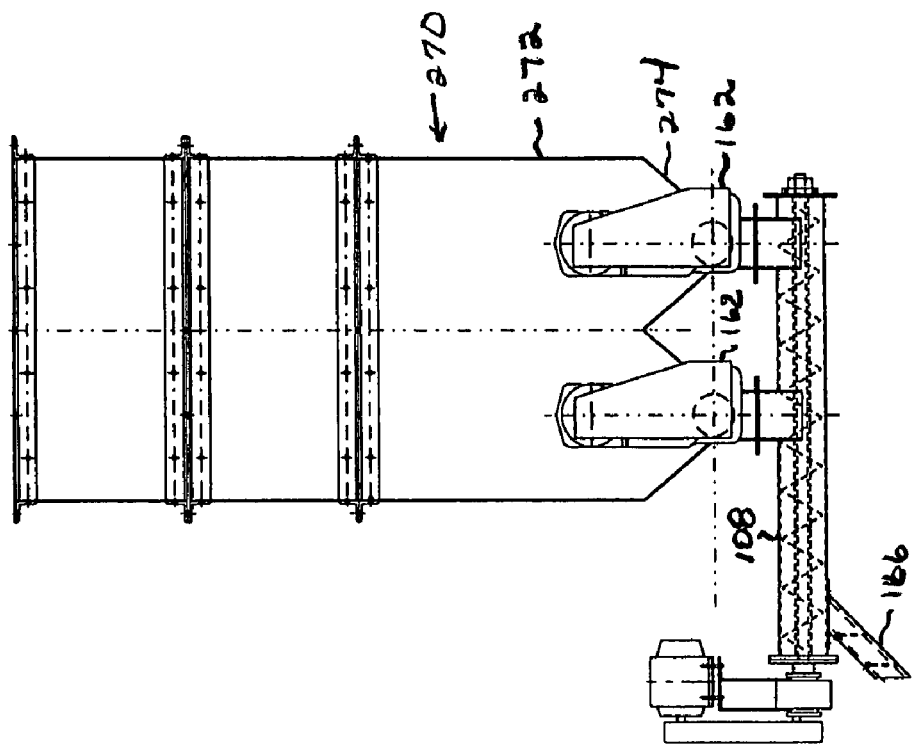
FIG. 22 is a front view of the secondary centrifuge collector of FIG. 21.
Figure 21:
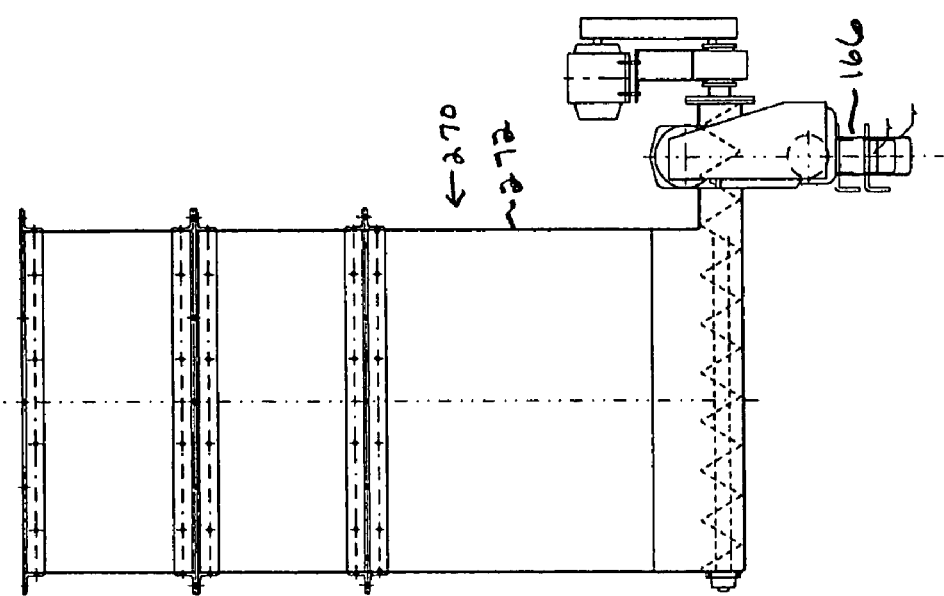
FIG. 21 is a side view of yet another embodiment of the secondary centrifuge collector of this invention.

Referring to FIGS. 21 and 22 yet another embodiment of the secondary centrifuge collector of this invention is shown at 270, in which the outer housing 272 has a doubly tapering lower hopper 274. The lower hopper 274 enables two of the secondary centrifuge collector units 162 empty into each portion of the lower hopper 274. A person of ordinary skill in the art will readily recognize that other configurations of the secondary centrifuge collector of this invention may be suitable for other embodiments having a plurality of secondary centrifuge collector units.

Referring again to FIG. 1, the induced draft fan 106, rotated by an electric motor 276 in this embodiment, is depicted. In the embodiment shown, the draft fan 106 induces negative pressure to draw air, or other fluid to be cleaned, through the assembly of this invention. By way of illustration and not limitation, the system depicted and described herein would be capable of cleaning between about 12,000 and 15,000 cubic feet of air per minute thus, the draft fan 106 would be able to convey between about 12,000 and 15,000 cubic feet of air per minute at a negative pressure of between about 3 inches water gage and 6 inches water gage. It is alternately recognized that a fluid flow induced by a positive pressure (e.g., by a fan or equivalent positioned upstream from the assembly of this invention) might be suitable for other embodiments of this invention.

The particulate disposal assembly 108 depicted in FIG. 1 has a housing 280 enclosing an auger screw 282. The auger screw 282 is rotated by a drive assembly 284. While an auger is shown, other equivalent mechanisms (e.g., conveyor belt, gravitationally dumped hoppers) for disposing of separated particulates may be suitable for other embodiments.

The first and second duct assemblies 110 and 112 conduct fluids (e.g., air) being cleaned between the primary centrifuge collector and secondary centrifuge collector and between the secondary centrifuge collector and the draft fan, respectively. The confirmation and makeup of these assemblies will depend upon how the primary and secondary centrifuge collectors and induction fan are positioned. Inner dimensions of 13⅝ inches×48 inches has been found to be suitable for the embodiment depicted. However, a person of ordinary skill in the art will readily recognize that other dimensions are suitable for other embodiments conveying, e.g., differing amounts of fluids at differing pressures and particulate loads.

The support frame 114 depicted in FIG. 1 includes a chassis 290, stands 292, and wheel assemblies 294. The support frame 114 may be made from materials dimensioned to operably support the weight of the assembly of this invention during transport and operation. Additionally, the support frame used should be capable of imparting sufficient stability so that it will not shift or become unstable due to vibrations arising from operation. While a portable unit is depicted, a person of ordinary skill in the art will recognize that the assembly for removing particles from fluid streams of this invention can be assembled in a stationary configuration. Additionally, the components of the assembly of this invention could be shipped and assembled at sites in modules.

Sheet and tubular metals, such as steel or aluminum are envisioned as suitable materials for certain embodiments of this invention. However, a person of ordinary skill in the art will recognize that certain components may be made from synthetic resins. Suitable synthetic resins for components such as the duct assemblies and secondary centrifuge collectors include polyethylene, polypropylene, and polytetrafluoroethylene. However, a person of ordinary skill in the art will readily recognize that other synthetic resins may be suitable for a given embodiment of this invention. Other suitable synthetic resins may be found in the Handbook of Plastics, Elastomers, and Composites, Charles A. Harper, Editor in Chief, Third Edition, McGraw-Hill, N.Y., 1996, hereby incorporated by reference.

Referring again to FIG. 1, during operation the induced draft fan 106, via an induced negative pressure, draws a fluid to be cleaned, such as air containing particulates from a hot asphalt mix plant, cement plant, foundry, coal fired boiler, or the like, into the primary centrifuge collector 102 as indicated by arrow 300. The fluid flow enters the primary centrifuge collector 102 via the inlet 121, wherein a first portion of the particulates are removed. Upon entering the primary centrifuge collector 102, the fluid stream forms an outer vortex 302, which is bounded by the primary centrifuge collector housing 120. Upon reaching the end of the primary centrifuge collector housing 120, the direction of the fluid stream is then reversed and develops into an inner vortex 304 spiraling toward, and entering, the cone frustum attached to the primary centrifuge collector outlet cylinder 122. The centrifugal forces exerted upon particulates in the fluid stream force the particulates out of the vortices 302 and 304 and against the housing 120. For example heavier particulates are forced from the vortex 302 and lighter particulates are forced from the vortex 304. The particulates then are gravitationally conveyed downwardly into the particulate disposal assembly 108, where they are removed. In place of the primary centrifuge collector 102, a vertical primary centrifuge known to those of ordinary skill in the art may be used in certain embodiments of this invention.

Figure 25:
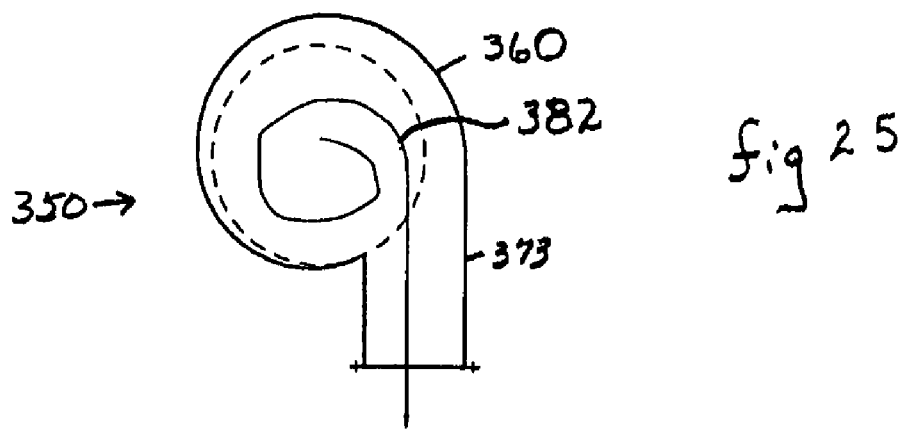
FIG. 25 is a top view of the vertical primary centrifuge of FIG. 24.
Figure 24:
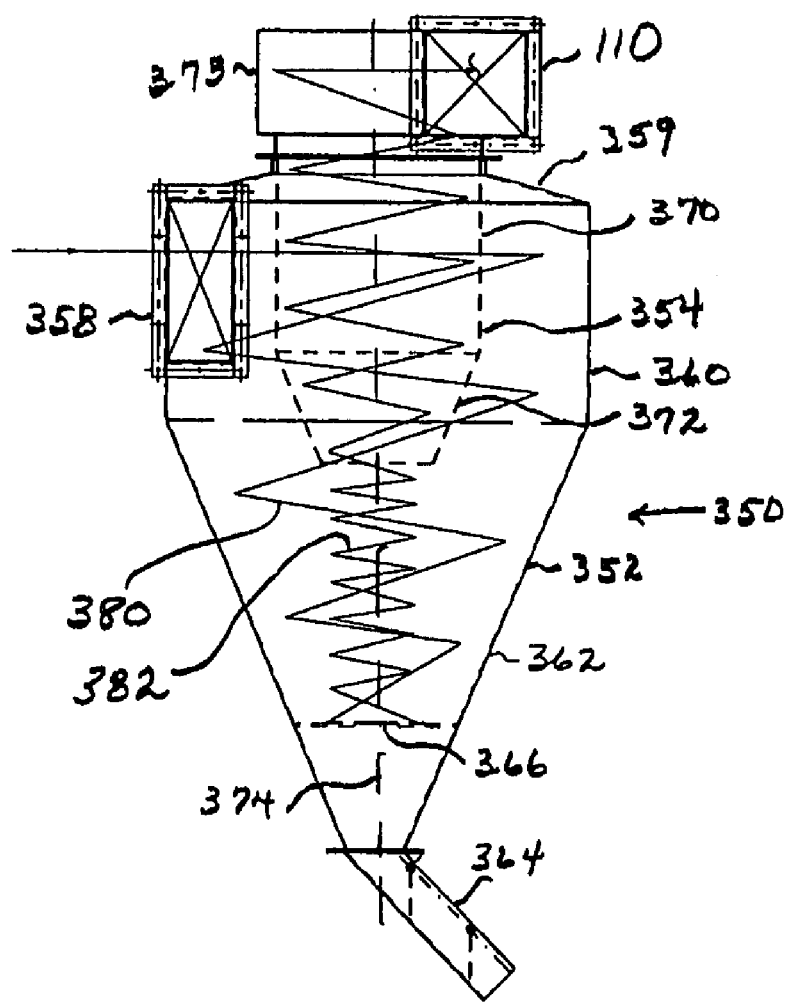
FIG. 24 is a side view of a vertical primary centrifuge optionally present in the assembly of this invention.

Referring to FIGS. 24 and 25, one suitable embodiment of a vertical primary centrifuge is depicted generally at 350 which may be present in place of, or in addition to, the primary centrifuge collector 102. The embodiment of the vertical primary centrifuge 350 depicted includes an outer housing assembly 352 and an outlet assembly 354. The outer housing assembly 352 has an inlet 358, a roof 359, a cylindrical element 360, a conical element 362, a spout 364, and a reflexive plate 366. The inlet 358 receives the fluid flow from which particulates are to be removed and conducts the fluid flow into the structure constituted by roof 359, the cylindrical element 360 and conical element 362. The conical element 362 tapers down to the spout 364. The spout 364 may include the trickle valve 176, or some other equivalent structure to empty separated particulates. The reflexive plate 366 is attached to a lower portion of the conical element 362, e.g., by welding and may be supported by a bar, as described above with respect to the bar 206 present in the outer cylinder 190 of the secondary centrifuge collector unit 160. The outlet assembly 354 includes a cylindrical element 370, which terminates in a frustum 372. The cylindrical element 370 is attached to the egress 373.

The cylindrical element 370 and frustum 372 are aligned with the reflexive plate 366, as can be seen by their relationships to the axis 374.

By way of illustration and not limitation, suitable dimensions for the vertical primary centrifuge 350 include an inlet 358 10 inches×22 inches, a cylindrical element 360 with a diameter of 60 inches and a height of 30 inches, a conical element with a height of 59½ inches and 362 tapering from an upper diameter of 60 inches to a lower diameter of 8 inches, a spout 364 with cross sectional dimensions of 6 inches×6 inches, and a reflexive plate with a diameter of 14 inches. The cylindrical element 370 may have a height of 27 inches and an outer diameter of 28⅞ inches. The frustum 372 may have a height of 14 inches and may taper from an outer diameter of 28⅞ inches to 16 inches. The egress 373 may have a height of 14 inches and cross sectional dimensions of 14×14 inches. These dimensions may vary depending on factors such as the magnitude of fluid to be treated, the pressures of such fluid within the assembly of this invention, and the magnitude and types of particulates present in the fluid which are to be removed. A person of ordinary skill in the art will readily recognize that other structures for performing the functions of the primary centrifuge collector 102 and/or vertical primary centrifuge 350 may be present in place of, or in addition to, these structures. Non-limiting examples of these structures which may be present in place of, or in addition to, the primary centrifuge collector 102 and/or vertical primary centrifuge 350 include cyclone separators (e.g., hydroclones) known to the art.

In operation, the fluid flow from which a first portion of the particulates are to be removed enters the inlet 358 and is directed into the interior of the vertical primary centrifuge housing assembly 352 bounded by the roof 359, cylindrical element 360 and conical element 362. The position and orientation of the inlet 358 directs the fluid flow into a spiraling outer vortex 380, thereby removing larger particulates from the fluid flow. The fluid in the outer vortex 380 then impinges the reflexive plate 366, thereby reversing the direction of the fluid flow into an inner vortex 382. The higher velocity, hence energy, of the fluid flow within the inner vortex 382 removes a further portion of smaller particulates from the fluid flow. From the inner vortex 382, the fluid flow enters the frustum 372, then the cylindrical element 370. From the cylindrical element 370, the fluid flow is transmitted into the egress 373. From the egress 373, the fluid flow enters the first duct assembly 110, which conducts the fluid flow to the secondary centrifuge collector 100 for this invention.

In place of, or in addition to, the vertical primary centrifuge 350, primary centrifuge collector 102, and secondary centrifuge collector 104, other fluid flow cleaning devices may be present. Suitable examples of such fluid flow cleaning devices are disclosed and described in U.S. Pat. No. 7,070,637 to Zhang, issued 4 Jul. 2006, U.S. Pat. No. 4,309,283 to Vikio et al., issued 5 Jan. 1982, U.S. Pat. No. 7,159,723 to Hilpert et al., issued 9 Jan. 2007, and U.S. Pat. No. 7,179,314 to Conrad et al., issued 20 Feb. 2007, each hereby incorporated by reference.

From the primary centrifuge collector 102 (or vertical primary centrifuge 350), the partially cleaned fluid stream is conveyed to the secondary centrifuge collector by the first duct assembly 110 as indicated by the arrow 306. Alternatively, the primary and secondary centrifuge collectors 102 and 104 (or equivalents) can be directly connected. If so, all or most of the first duct assembly 110 would not be present.

As depicted in FIG. 23, the first duct assembly 110 delivers the fluid flow to the secondary centrifuge collector 104 (or other secondary centrifuge collector embodiments), where the fluid flow enters one of the secondary centrifuge collector units 160 as depicted by arrow 308 (FIG. 23) where a second portion of the particulates are removed. When entering the secondary centrifuge collector unit 160, the fluid flow enters via the flange opening 209 into the cylindrical member cavity 210, where the fluid flow impinges the swirl vanes 226. Impinging the swirl vanes 226 configures the fluid flow into an outer vortex 308. The fluid flow is conveyed downwardly within the outer vortex 308 until it impinges the reflexive plate 204. After impinging the reflexive plate 204, the direction of fluid flow is reversed to form an inner vortex 310. The fluid flow then is conveyed by the inner vortex into the cavity 236 of the secondary centrifuge collector unit outlet element 192, from where it is conveyed from the secondary centrifuge collector unit 160 via the opening 233 (FIG. 17), then from the entire secondary centrifuge collector 104 into the second duct assembly 112. While inside the secondary centrifuge collector units 160 the centrifugal forces resulting from the vortices 308 and 310 further separate particulates from the fluid stream. In certain embodiments a centrifugal force of 9000 times the force of gravity is exerted upon the particulates within the inner vortex 310 to remove most or essentially all particulates from the fluid stream. The separated particulates fall downwardly, as indicated by the arrow's 314, and are removed from the secondary centrifuge collector 104 by the particulate disposal assembly 108 (FIG. 1).

Referring yet again to FIG. 1, the duct assembly 112 conveys the cleaned fluid stream to the induced draft fan 106 as shown by arrow. The induced draft fan 106 then conveys the fluid stream into the environmental atmosphere as shown by arrow 316.

A person of ordinary skill in the art will readily appreciate that individual components shown on various embodiments of the present invention are interchangeable to some extent and may be added or interchanged on other embodiments without departing from the spirit and scope of this invention.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed:

1. An assembly for separating particulates from a fluid stream, comprising:
   a primary centrifuge collector receiving said fluid stream having said particulates, said primary centrifuge comprising an outer housing and a generally horizontal egress conveying said fluid stream away from said primary centrifuge collector, said primary centrifuge collector removing a first portion of said particulates; and
   a secondary centrifuge collector comprising a plurality of secondary centrifuge units positioned within a secondary centrifuge collector housing, each secondary collector unit receiving a portion of said fluid stream from said primary centrifuge collector and removing a second portion of said particulates from said fluid stream, each said secondary centrifuge collector unit comprising an outer cylinder having a generally flat reflexive plate, a generally cylindrical outlet element terminating in a cone frustum aligning with said reflexive plate, and a vaned outlet element, said vanes attached to an outer surface of the outlet element and disposed concentrically with respect to the outer cylinder.

2. The assembly of claim 1, in which the secondary centrifuge collector comprises upper and lower mounting plates, the outlet elements mounted to the upper plate and the outer cylinders mounted to the lower plate.

3. The assembly of claim 1, wherein said reflexive plate is remotely positioned from the outlet element.

4. The assembly of claim 1, wherein particulates separated by said primary and secondary centrifuge collectors are conveyed from said primary and secondary centrifuge collectors by gravity.

5. The assembly of claim 1, further comprising ducting conveying said fluid stream from the primary centrifuge collector to the secondary centrifuge collector.

6. The assembly of claim 1, further comprising an auger for conveying removed particulates from said primary and secondary centrifuge collectors.

7. The assembly of claim 1, further comprising a fan imparting negative pressure to generate said fluid stream.

8. The assembly of claim 1, in which the secondary centrifuge collector comprises four of said secondary centrifuge units.

9. The assembly of claim 7, further comprising a particulate disposal assembly.

10. The assembly of claim 7, further comprising a support frame having a chassis, stands and wheel assemblies.

11. The assembly of claim 7, wherein said fan induces a negative pressure of between about 3 and 6 inches water gauge.

12. A secondary centrifuge, comprising a housing and a plurality of secondary centrifuge units disposed within the housing, each of said units comprising:
an outer cylinder;
a generally flat reflexive plate positioned proximate at a lower end of the outer cylinder; and
a vaned outlet element terminating in a cone frustum, the vaned outlet generally concentric to the outer cylinder and generally aligning with the reflexive plate for receiving a vortexed air stream induced by said vanes, the vortexed air stream centrifugally separating particulates therefrom.

13. The secondary centrifuge of claim 12, wherein each reflexive plate is disposed in the outer cylinder remote from the outlet element.

14. A method of cleaning particulates from an air stream by centrifugal force, comprising:
passing said air steam through a horizontal primary centrifuge or primary centrifuge collector, thereby removing a first portion of said particulates from said air stream; and
conveying said air stream emerging from said vertical primary centrifuge or said primary centrifuge through a secondary centrifuge collector having a plurality of secondary centrifuge units disposed within a secondary centrifuge collector housing, a portion of said air stream entering an outer cylinder of one of said units and impinging against a plurality of vanes to induce an outer vortex, said outer vortex extending to a bottom of said outer hopper, then said air stream conveyed in an inner vortex by a generally flat reflexive plate, the inner vortex directionally counter to said outer vortex, said air stream in said inner vortex exiting said outer cylinder through a cone frustum attached to a bottom of an outlet unit, said inner and said outer vortices centrifugally removing a second portion of said particulates from said air stream.

15. The method of claim 14, in which said air stream is conveyed to an induced draft fan by said second duct system and in which said air stream is released to the environment from said fan.

16. A method of manufacturing an assembly for separating particulates from a fluid stream, comprising:
providing a primary centrifuge collector comprising a primary centrifuge housing and a generally horizontal outlet cylinder terminating in a cone frustum, and
disposing a secondary centrifuge collector downstream from said primary centrifuge collector, said secondary centrifuge collector having a plurality of secondary centrifuge collector units disposed within a housing, each of said units comprising an outer cylinder and a generally flat reflexive plate, said outer cylinder receiving said fluid stream from said primary centrifuge collector and an outlet element generally concentric to the outer cylinder, said outlet element terminating in a frustum and comprising helical vanes attached to an outer surface of said outlet element.

17. The method of claim 16, further comprising connecting a first duct system between said primary centrifuge collector and said secondary centrifuge collector.

18. The method of claim 16, further comprising disposing a particulate disposal assembly so as to remove said particulates separated from said fluid stream.

19. The method of claim 16, further comprising disposing a fan proximate said secondary centrifuge collector so as to induce a negative pressure on said fluid stream.

* * * * *